US008737641B2

(12) United States Patent
Tasaki et al.

(10) Patent No.: US 8,737,641 B2
(45) Date of Patent: May 27, 2014

(54) NOISE SUPPRESSOR

(75) Inventors: Hirohisa Tasaki, Tokyo (JP); Satoru Furuta, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 588 days.

(21) Appl. No.: 13/054,589

(22) PCT Filed: Nov. 4, 2008

(86) PCT No.: PCT/JP2008/003162
§ 371 (c)(1),
(2), (4) Date: Jan. 18, 2011

(87) PCT Pub. No.: WO2010/052749
PCT Pub. Date: May 14, 2010

(65) Prior Publication Data

US 2011/0123045 A1 May 26, 2011

(51) Int. Cl.
*H04B 15/00* (2006.01)
*H04R 25/00* (2006.01)

(52) U.S. Cl.
USPC .......................................... 381/94.3; 381/317

(58) Field of Classification Search
USPC .......... 381/94.1–94.9, 71.1, 71.11–71.14, 56, 381/317, 318, 104; 700/94
See application file for complete search history.

(56) References Cited

U.S. PATENT DOCUMENTS

| | | | | |
|---|---|---|---|---|
| 3,327,058 | A * | 6/1967 | Coker | 704/209 |
| 5,706,395 | A * | 1/1998 | Arslan et al. | 704/226 |
| 5,982,906 | A * | 11/1999 | Ono | 381/94.2 |
| 6,088,668 | A | 7/2000 | Zack | |
| 7,003,452 | B1 * | 2/2006 | Lubiarz et al. | 704/210 |
| 7,043,030 | B1 | 5/2006 | Furuta | |
| 2005/0010406 | A1 | 1/2005 | Koshiba et al. | |
| 2005/0119882 | A1 * | 6/2005 | Bou-Ghazale | 704/227 |
| 2005/0152563 | A1 | 7/2005 | Amada et al. | |
| 2010/0274561 | A1 * | 10/2010 | Ahgren et al. | 704/226 |

FOREIGN PATENT DOCUMENTS

| | | | |
|---|---|---|---|
| CN | 1307716 | A | 8/2001 |
| CN | 1146155 | C | 4/2004 |
| JP | 3454190 | B2 | 7/2003 |
| JP | 2004-341339 | A | 12/2004 |
| JP | 2004-347956 | A | 12/2004 |
| JP | 2005-195955 | A | 7/2005 |

OTHER PUBLICATIONS

Boll, S. F. "Suppression of Acoustic Noise in Speech Using Spectral Subtraction", IEEE Transactions on Acoustics, Speech, and Signal Processing, vol. ASSP-27, No. 2, Apr. 1979, pp. 113-120.

* cited by examiner

*Primary Examiner* — Davetta W Goins
*Assistant Examiner* — Daniel Sellers
(74) *Attorney, Agent, or Firm* — Birch, Stewart, Kolasch & Birch, LLP.

(57) ABSTRACT

A noise suppressor selects, for individual frequency components, maximums by comparing a plurality of noise suppressed spectra 105 and 106 a plurality of noise suppressing units 4 and 5 output, thereby obtaining an output spectrum 107 having the frequency components selected as its components. A first noise suppressing unit 4 generates a noise suppressed spectrum 105 by multiplying an input spectrum 102 by amplitude suppression gains, and makes the amplitude suppression gains greater than most of the amplitude suppression gains in a noise signal intervals of a second noise suppressing unit 5.

10 Claims, 4 Drawing Sheets

NOISE SUPPRESSOR

TECHNICAL FIELD

The present invention relates to a noise suppressor capable of improving the sound quality of a voice communication system/hands-free telephone system/video conferencing system such as a mobile phone and the recognition rate of a voice recognition system by suppressing noise other than an intended signal such as a voice-acoustic signal in a voice communication system, voice recognition system and the like used under various noise environment.

BACKGROUND ART

As a typical method of noise suppression for emphasizing an intended signal, a voice signal or the like, by suppressing noise, an unintended signal, from an input signal into which noise is mixed, a spectral subtraction (SS) method has been known, for example. The SS method carries out noise suppression by subtracting from an amplitude spectrum an average noise spectrum estimated separately (see Non-Patent Document 1, for example).

When noise suppression such as a spectral subtraction method has been performed, estimated errors of the noise spectrum remain in the signal after the noise suppression as distortions which give characteristics very different from the signal before the processing and appear as harsh noise (also called artificial noise or musical tone), thereby sometimes deteriorating subjective quality of the output signal greatly.

As a method of suppressing the subjective deterioration feeling mentioned above, there is one disclosed in Patent Document 1. Patent Document 1 aims at providing a noise suppressor that does not produce musical noise in noise intervals, and does not produce distortion in voice intervals. It comprises a voice/noise decision unit for deciding intended signal intervals and noise signal intervals from the input signal; a noise suppressing unit for suppressing noise from the input signal and estimated noise signal in accordance with a first suppression coefficient; a noise over-suppressing unit for suppressing noise from the input signal and estimated noise signal in accordance with a second suppression coefficient greater than the first suppression coefficient; and a switching unit for switching between the output signal of the noise suppressing unit and the output signal of the noise over-suppressing unit in accordance with the decision result of the voice/noise decision unit.

Non-Patent Document 1: Steven F. Boll, "Suppression of Acoustic noise in speech using spectral subtraction", IEEE Trans. ASSP, Vol. ASSP-27, No. 2, April 1979.

Patent Document 1: Japanese Patent Laid-Open No. 2005-195955 (pp. 8-9, and FIG. 1 and FIG. 2).

With the foregoing configuration, the conventional noise suppressor switches between the output signal of the noise suppressing unit and the output signal of the noise over-suppressing unit in accordance with the decision result of the voice/noise decision unit. Accordingly, it has a problem of being unable to avoid quality deterioration due to erroneous decision. In addition, it has a problem of being difficult to make a completely correct decision because the voice signal and noise signal are infinitely various and involves time fluctuations.

In particular, if it makes an erroneous decision that a noise signal interval is a voice signal interval, it produces musical noise in that interval, thereby offering a problem of greatly deteriorating the quality.

In addition, even in voice signal intervals, if voice components are very small when considered from the individual frequency bands, a problem arises in that if there is a band in which the noise components are dominant, musical noise arises in that band, thereby deteriorating the quality greatly.

Furthermore, when it makes an erroneous decision that a voice signal interval is a noise signal interval, although it reduces the suppression of the voice by adding the input signal, if it makes erroneous decisions frequently within the same voice signal interval, a problem arises of giving a feeling of unstable fluctuations, thereby deteriorating the quality.

The present invention is implemented to solve the foregoing problems. Therefore it is an object of the present invention to provide a noise suppressor with high sound quality capable of reducing the occurrence of musical noise.

DISCLOSURE OF THE INVENTION

A noise suppressor in accordance with the present invention comprises: a plurality of noise suppressing units for performing noise suppression on an input spectrum and for outputting noise suppressed spectra obtained; and a selecting unit for selecting, for each frequency component, a noise suppressed spectrum with a maximum value by comparing values of the plurality of noise suppressed spectra, and for outputting as a spectrum having the frequency components selected.

According to the present invention, since it is configured in such a manner as to comprise a plurality of noise suppressing units for performing noise suppression on an input spectrum and for outputting noise suppressed spectra obtained; and a selecting unit for selecting, for each frequency component, a noise suppressed spectrum with a maximum value by comparing values of the plurality of noise suppressed spectra, and for outputting as a spectrum having the frequency components selected, it can select a spectrum which is not suppressed excessively, thereby being able to realize a high quality noise suppressor capable of reducing the musical noise sharply and the unstable fluctuations in the voice signal intervals.

BEST MODE FOR CARRYING OUT THE INVENTION

The best mode for carrying out the invention will now be described with reference to the accompanying drawings to explain the present invention in more detail.

Embodiment 1

Figure 1:
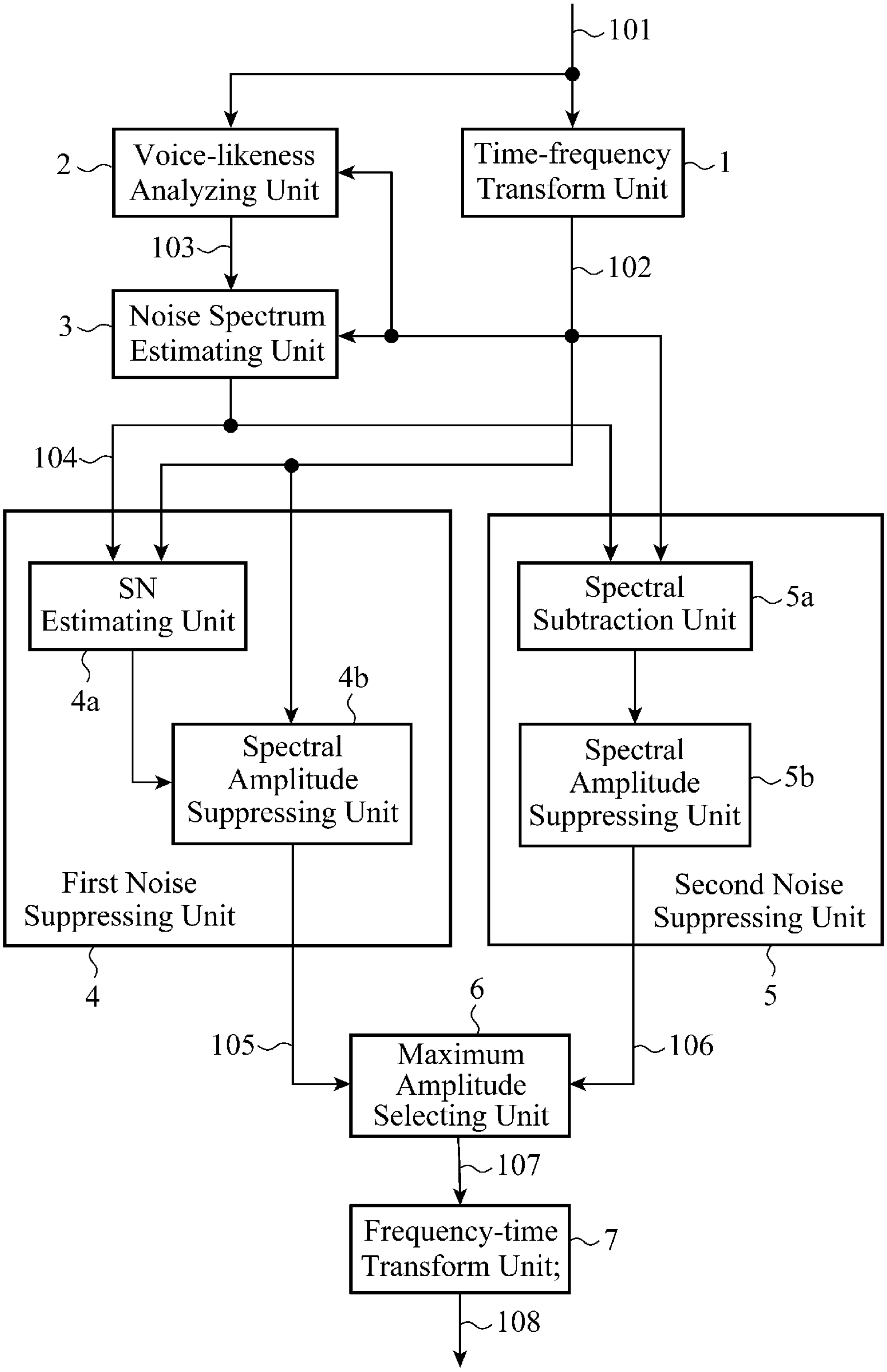
FIG. 1 is a block diagram showing a configuration of the noise suppressor of an embodiment 1.

FIG. 1 is a block diagram showing a configuration of the noise suppressor of an embodiment 1.

The noise suppressor comprises a time-frequency transform unit 1, a voice-likeness analyzing unit 2, a noise spectrum estimating unit 3, a first noise suppressing unit 4, a second noise suppressing unit 5, a maximum amplitude selecting unit 6 and a frequency-time transform unit 7.

In addition, the first noise suppressing unit 4 comprises an SN estimating unit 4*a* and a spectral amplitude suppressing unit 4*b*; and the second noise suppressing unit 5 comprises a spectral subtraction unit 5*a* and a spectral amplitude suppressing unit 5*b*.

Next, the operating principle of the noise suppressor will be described.

First, an input signal 101 is sampled at a prescribed sampling frequency (8 kHz, for example), undergoes frame splitting at a prescribed frame period (20 msec, for example) and is input to the time-frequency transform unit 1 and voice-likeness analyzing unit 2.

The time-frequency transform unit 1 performs windowing on the input signal 1 split into the frame period, and transforms the signal after the windowing into an input spectrum 102 consisting of spectral components for the individual frequencies using a 256-point FFT (Fast Fourier Transform), for example. The time-frequency transform unit 1 supplies the input spectrum 102 to the voice-likeness analyzing unit 2, noise spectrum estimating unit 3, SN estimating unit 4*a*, spectral amplitude suppressing unit 4*b*, spectral subtraction unit (subtraction unit) 5*a* and spectral amplitude suppressing unit (amplitude suppressing unit) 5*b*. As for the windowing, a well-known technique such as a Hanning window and trapezoid window can be employed. As for the FFT, since it is a widely known technique, its description will be omitted.

Using the input signal 101, input spectrum 102 the time-frequency transform unit 1 outputs and the estimated noise spectrum 104 of the previous frame stored in an internal memory of the noise spectrum estimating unit 3 which will be described later, the voice-likeness analyzing unit 2 calculates, as the degree of whether the input signal 1 in the current frame is more like voice or noise, a voice-likeness estimation value 103 that takes a large evaluation value when the probability of voice is high, and a small evaluation value when the probability of voice is low, and supplies it to the noise spectrum estimating unit 3.

As the calculation method of the voice-likeness estimation value 103, it is possible, for example, to employ the maximum value of autocorrelation analysis results of the input signal 101 or a frame SN ratio that can be calculated from the ratio between the power of the input spectrum 102 and the power of the estimated noise spectrum 104 separately or in combination. Here, the maximum value $ACF_{max}$ of the autocorrelation analysis of the input signal 101 is given by Expression (1) and the frame SN ratio $SNR_{fr}$ is given by Expression (2), respectively. As for the estimated noise spectrum 104, that of the previous frame stored in the internal memory of the noise spectrum estimating unit 3 which will be described later is read and used.

$$ACF_{max} = \max_{j=0}^{N}\left(\frac{\sum_{t=0}^{N-k} x(t)x(t+j)}{\sum_{t=0}^{N}(x(t))^2}, 0\right) \tag{1}$$

$$SNR_{fr} = \max\left\{20\log_{10}\left(\sum_{k=0}^{M} S(k)\right) - 20\log_{10}\left(\sum_{k=0}^{M} N(k)\right), 0\right\} \tag{2}$$

Here, x(t) is the input signal 101 split into a frame at time t, N is an autocorrelation analysis interval length, S(k) is a k-th component of the input spectrum 102, N(k) is a k-th component of the estimated noise spectrum 104 and M is the number of the FFT points.

From the maximum value $ACF_{max}$ of the autocorrelation analysis obtained by the foregoing Expression (1) and the frame SN ratio $SNR_{fr}$ obtained by Expression (2), the voice-likeness estimation value VAD can be calculated by the following Expression.

$$VAD = w_{ACF} \cdot ACF_{max} + w_{SNR} \cdot SNR_{fr} \cdot SNR_{norm} \tag{3}$$

Here, $SNR_{norm}$ is a prescribed value for normalizing the value $SNR_{fr}$ into the range 0-1, and $w_{ACF}$ and $w_{SNR}$ are prescribed values for weighting. They can be each adjusted in advance in such a manner that the voice-likeness estimation value VAD can be decided appropriately in accordance with the type of noise and the power of the noise. Incidentally, $ACF_{max}$ takes a value in the range of 0-1 according to the property of the foregoing Expression (1). The voice-likeness estimation value 103 that is calculated by the processing described above is supplied to the noise spectrum estimating unit 3.

In addition, setting the value of either $w_{ACF}$ or $w_{SNR}$ at zero in the foregoing Expression (3) makes it possible to calculate the voice-likeness estimation value 103 using only the parameter set at nonzero. More specifically, when $w_{SNR}$ is set at zero, the voice-likeness estimation value 103 is obtained using only the maximum value $ACF_{max}$ of the autocorrelation analysis.

Furthermore, at the calculation of the voice-likeness estimation value 103, it is possible to add an analysis parameter other than the indicators/values shown in the foregoing Expression (3). For example, it is possible to modify it appropriately in such a manner as to employ the sum of SN ratios of the spectral components for the individual frequencies, which are calculated using the input spectrum 102 and estimated noise spectrum 104 (the possibility of voice increases with an increase of the sum), or to employ the variance of the SN ratios of the spectral components for the individual frequencies (the possibility of voice increases as the variance increases, in which case the harmonic structure of the voice appears stronger).

The noise spectrum estimating unit 3, referring to the voice-likeness estimation value 103 supplied from the voice-likeness analyzing unit 2, updates, when the possibility of voice of the input signal mode of the current frame is low, the estimated noise spectrum of the previous frame stored in the internal memory (not shown) using the input spectrum 102 of the current frame, and supplies the updated result to the SN estimating unit 4*a* and spectral subtraction unit 5*a* as the estimated noise spectrum 104. The update of the estimated noise spectrum is carried out by reflecting the input spectrum according to the following Expression (4), for example.

$$\tilde{N}(n,k) = (1-\alpha(k)) \cdot N(n-1,k) + \alpha(k) \cdot S_{noise}(n,k); k=0, \ldots, M \tag{4}$$

Here, n is a frame number, N(n−1,k) is the estimated noise spectrum before the update, $S_{noise}$ (n,k) is the input spectrum of the current frame as to which a decision is made that the possibility of voice is low, and N(n,k) tilde is the estimated noise spectrum after the update. In addition, α(k) is a prescribed update speed coefficient with a value from zero to one, and is preferably set at a value comparatively close to zero. Furthermore, it is sometimes better to increase the coefficient a little with the frequency, and to adjust it in accordance with the type of the noise or the like.

Incidentally, as for the update method of the estimated noise spectrum, to further improve the estimated accuracy and estimated trackability, it can be altered appropriately such as applying a plurality of update speed coefficients in accordance with the voice-likeness estimation value 103; referring to fluctuations in the power of the input spectrum or in the power of the estimated noise spectrum between the frames and applying the update speed coefficient that will increase the update speed when the fluctuations are large; or replacing (resetting) the estimated noise spectrum by the input spectrum of the frame with the minimum power or with the least voice-likeness estimation value in a certain time period. In addition, when the voice-likeness estimation value 103 is large enough, that is, when the probability that the input signal of the current frame is voice is high, the estimated noise spectrum need not be updated.

In the first noise suppressing unit 4, the SN estimating unit 4*a* calculates the estimated SN ratios from the input spectrum 102 and the estimated noise spectrum 104, and the spectral amplitude suppressing unit 4*b* calculates the amplitude suppression gains from the estimated SN ratios, multiplies the amplitude suppression gains by the input spectrum 102, and supplies the result obtained to the maximum amplitude selecting unit 6 as a first noise suppressed spectrum 105.

Incidentally, as for the calculation of the estimated SN ratio in the SN estimating unit 4*a*, it can be carried out in the same manner as the calculation of the frame SN ratio of the foregoing Expression (2), for example. When the voice-likeness analyzing unit 2 calculates the frame SN ratio, it is also possible to use it as the estimated SN ratio without change or after applying appropriate processing such as smoothing in the time axis direction.

As for the calculation of the amplitude suppression gain in the spectral amplitude suppressing unit 4*b*, it is performed in such a manner that the amplitude suppression gain becomes large for a frame having a high estimated SN ratio, and becomes small for a frame having a low estimated SN ratio. As for the amplitude suppression gain, however, it has been set in such a manner as to have a value greater than most of the amplitude suppression gains (that is, the amplitude ratios between the input spectrum 102 and a second noise suppressed spectrum 106 which will be described later) in the noise signal intervals of the second noise suppressing unit 5 which will be described later.

For example, using the estimated SN ratio and the power of the input spectrum 102, it estimates the voice power of the frame, that is, the power after removing the noise, obtains the amplitude suppression gain in such a manner that the power of the first noise suppressed spectrum 105 agrees with the voice power, and replaces, when the amplitude suppression gain becomes less than a prescribed lower limit value, the amplitude suppression gain by the lower limit value.

On the other hand, in the second noise suppressing unit 5, the spectral subtraction unit 5*a* performs the spectral subtraction based on the estimated noise spectrum 104 on the input spectrum 102, performs on the spectrum after the subtraction the spectral amplitude suppression in which the spectral amplitude suppressing unit 5*b* gives an amount of attenuation to the spectral components of the individual frequencies, and supplies the result obtained to the maximum amplitude selecting unit 6 as the second noise suppressed spectrum 106.

Here, the spectral amplitude suppressing unit 5*b* performs adaptive control of the amounts of attenuation in such a manner as to reduce the fluctuations in the amplitude suppression gains of the whole second noise suppressing unit 5 (that is, the amplitude ratios between the input spectrum 102 and the second noise suppressed spectrum 106) in the noise signal intervals.

Incidentally, as a configuration of the second noise suppressing unit 5, one described in the "Noise Suppressing Apparatus and Method" described in Japanese Patent No. 3454190 is applicable, for example.

In addition, a configuration is also possible which reverses the order of the spectral amplitude suppressing unit 5*b* and the spectral subtraction unit 5*a* so that the spectral amplitude suppressing unit 5*b* performs on the input spectrum 102 the spectral amplitude suppression that gives amounts of attenuation to the spectral components of the individual frequencies, and the spectral subtraction unit 5*a* performs on the spectrum after the amplitude suppression the spectral subtraction based on the estimated noise spectrum 104 and supplies the result obtained to the maximum amplitude selecting unit 6 as the second noise suppressed spectrum 106.

The maximum amplitude selecting unit 6 compares the first noise suppressed spectrum 105 with the second noise suppressed spectrum 106, selects the greater spectral components for the individual frequencies, collects the greater spectral components selected, and supplies to the frequency-time transform unit 7 as an output spectrum 107.

The frequency-time transform unit 7 applies an inverse FFT to the output spectrum 107 supplied from the maximum amplitude selecting unit 6 to return to a time domain signal, performs windowing and concatenation for smooth connection between the previous and subsequent frames, and outputs the signal obtained as the output signal 108.

Figure 2:
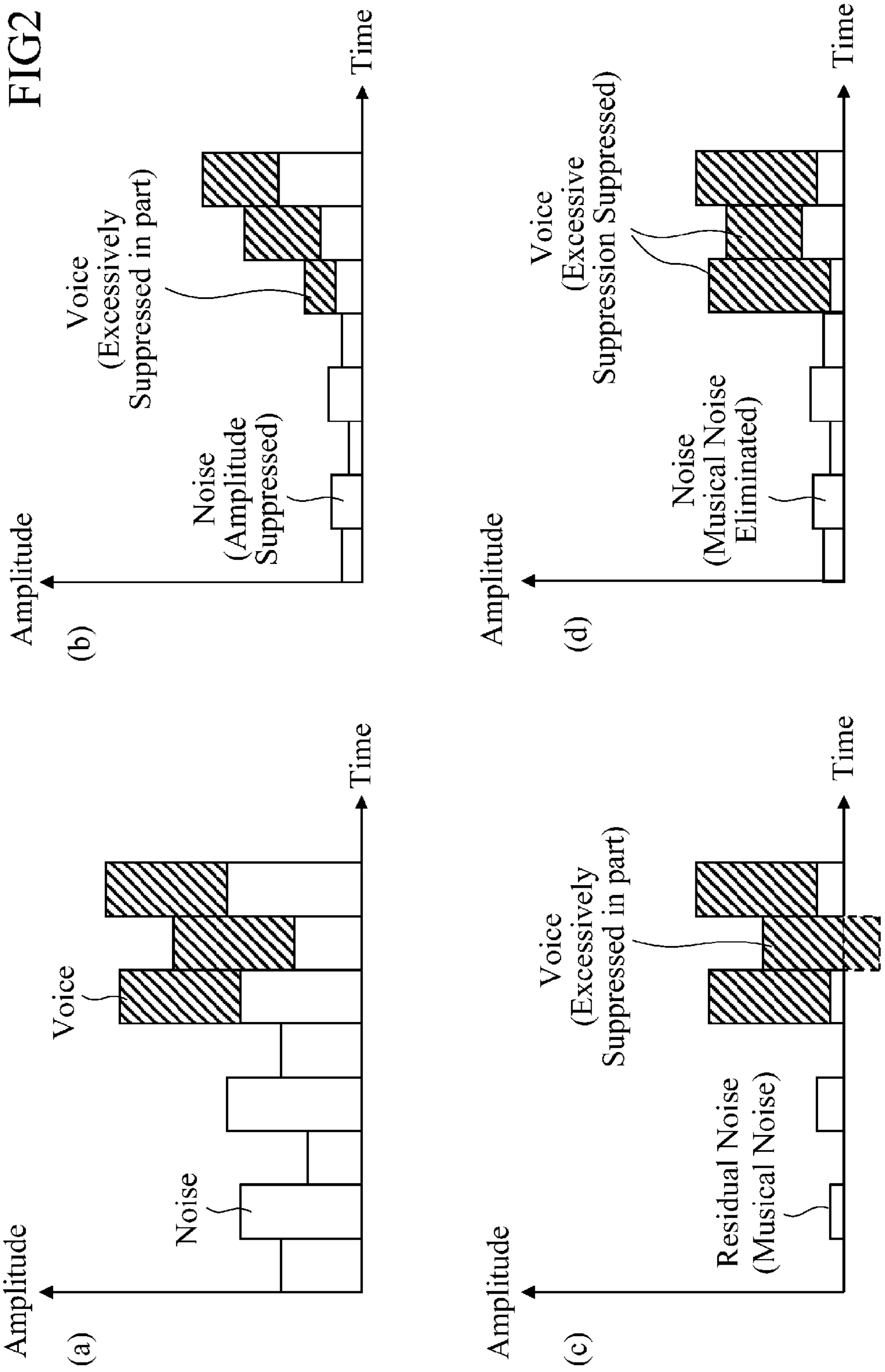
FIG. 2 is a schematic diagram showing an example of time transitions of spectral components in the embodiment 1.

FIG. 2 shows time transitions of the spectral components at a certain frequency. FIG. 2(*a*) shows a time transition of an input spectrum, FIG. 2(*b*) shows that of the first noise suppressed spectrum, FIG. 2(*c*) shows that of the second noise suppressed spectrum, and FIG. 2(*d*) shows that of the output spectrum. In the drawings, the horizontal axis shows the time and the vertical axis shows the amplitude. Furthermore, outline columns show the noise amplitude and diagonally shaded columns show the voice amplitude. Along the time axis, five intervals in the first half are noise signal intervals, and three intervals in a second half are voice signal intervals upon which noise is superposed.

The first noise suppressing unit 4 calculates the amplitude suppression gains from the estimated SN ratios as described above, and obtains the first noise suppressed spectrum 105 shown in FIG. 2(*b*) by multiplying the input spectrum 102 shown in FIG. 2(*a*) by the amplitude suppression gains. In the noise signal intervals, since the estimated SN is low, small amplitude suppression gains are calculated so that the amplitude of the first noise suppressed spectrum becomes small. In the voice signal intervals, since the estimated SN is high, large amplitude suppression gains are calculated so that the amplitude of the first noise suppressed spectrum does not become small so much. Incidentally, at the beginning of the voice signal intervals, the estimated SN is apt to be estimated lower. Accordingly, as shown in FIG. 2(*b*), the voice is suppressed too much for its amplitude, which can sometimes bring about disconnected feeling of the voice.

The second noise suppressing unit 5 performs the subtraction and amplitude suppression from the input spectrum 102 shown in FIG. 2(*a*) according to the estimated noise spectrum 104, thereby obtaining the second noise suppressed spectrum 106 as shown in FIG. 2(*c*), the amplitude of which is generally reduced in the noise signal intervals, and approaches the amplitude of the voice in the voice signal intervals. However, if the estimated noise spectrum 104 becomes greater than actual values owing to fluctuations in the noise or errors of the voice-likeness estimation values, residual noise remains like islands as shown in FIG. 2(*c*) in the noise signal intervals, thereby producing offensive artificial noise (musical noise).

In the voice signal intervals, on the other hand, a disconnected feeling of the voice owing to excessive suppression is produced.

FIG. 2(*d*) shows the output spectrum 107 the maximum amplitude selecting unit 6 obtains by selecting greater one of the first noise suppressed spectrum 105 of FIG. 2(*b*) and the second noise suppressed spectrum 106 of FIG. 2(*c*). Since the amplitude suppression gains in the first noise suppressing unit 4 are set in such a manner as to become greater than most of the amplitude suppression gains in the noise signal intervals of the second noise suppressing unit 5, the amplitude of the first noise suppressed spectrum 105 becomes greater in most of the noise signal intervals and is selected as the output spectrum 107. Thus, the island-like residual noise in the noise signal intervals is eliminated and the musical noise is cleared away. In addition, in the voice signal intervals, since the lesser excessive suppression columns are selected, the output spectrum 107 with lesser excessive suppression is obtained, which reduces the disconnected feeling of the voice.

Incidentally, although the foregoing embodiment 1 has a configuration including two noise suppressing units, the first noise suppressing unit 4 and second noise suppressing unit 5, a configuration is also possible which comprises three or more noise suppressing units, in which the maximum amplitude selecting unit 6 selects the maximum values of the spectral components for the individual frequencies from the three or more noise suppressed spectrums.

In addition, although the second noise suppressing unit 5 has a configuration including the spectral subtraction unit 5*a* and spectral amplitude suppressing unit 5*b*, a configuration is also possible which includes only the spectral subtraction unit 5*a*, for example.

Furthermore, although the foregoing embodiment 1 is configured in such a manner that the voice-likeness analyzing unit 2 and noise spectrum estimating unit 3 perform the estimation of the estimated noise spectrum 104, a means for obtaining the estimated noise spectrum 104 is not limited to the configuration.

For example, a method can also be employed which obviates the voice-likeness analyzing unit 2 by configuring the noise spectrum estimating unit 3 in such a manner as to perform the update very slowly and without interruption, or which does not perform the estimation of the estimated noise spectrum 104 from the input signal 101 but performs the analysis/estimation separately from the input signal used for the noise estimation, to which only noise is input.

As described above, according to the present embodiment 1, it is configured in such a manner as to compare for the individual frequency components the values of the first and second noise suppressed spectra 105 and 106 the first and second noise suppressing units 4 and 5 output, and to obtain the output spectrum 107 by selecting the maximum values between them as the frequency components. Thus, it can select the spectrum not suppressed excessively, thereby being able to realize a high quality noise suppressor capable of reducing the musical noise sharply and reducing unstable fluctuations in the voice signal intervals.

In addition, since it makes spectrum selection according to the comparison between the individual frequency components, it differs from the conventional technique which selects one of the outputs of the noise suppressing unit according to the voice/noise decision, in which the noise suppressing unit switches all the frequency components collectively. Thus, the present embodiment can prevent large fluctuations in the spectrum and the quality deterioration due to the error of the voice/noise decision, and can suppress the occurrence of musical noise in a band in which the noise components in the voice signal intervals are dominant.

Besides, according to the present embodiment 1, since it is configured in such a manner as to set the amplitude suppression gains of the first noise suppressing unit 4 at values greater than most of the amplitude suppression gains in the noise signal intervals of the second noise suppressing unit 5, and to generally select the output of the first noise suppressing unit 4 in the noise signal intervals, it can improve the quality because its output undergoes only the amplitude suppression that does not cause musical noise in the noise signal intervals.

In addition, when it comprises a plurality of noise suppressing units, since it can employ a system that allows the other noise suppressing units to produce the musical noise in the noise signal intervals and that has good quality in the voice signal intervals, it can realize high quality noise suppression in the voice signal intervals as well.

Furthermore, according to the present embodiment 1, since it is configured in such a manner as to increase the amplitude suppression gains of the first noise suppressing unit 4 when the estimated SN ratios are high and to reduce them when the estimated SN ratios are low, the amplitude suppression gains become small in the voice signal intervals. Thus, when the other noise suppressing units cause excessive suppression, it selects the output of the first noise suppressing unit, thereby being able to improve the quality.

Moreover, according to the present embodiment 1, it is configured in such a manner that the second noise suppressing unit 5 generates the noise suppressed spectrum by combining the spectral subtraction with the spectral amplitude suppression. Accordingly, it can adaptively control the amounts of attenuation of the spectral amplitude suppressing unit 5*b* in such a manner as to reduce the fluctuations in the amplitude suppression gains in the noise signal intervals as the whole second noise suppressing unit 5. This makes it easier to set the output of the first noise suppressing unit to be selected generally in the noise signal intervals. This enables further suppression of the musical noise in the noise signal intervals.

Embodiment 2

Figure 3:
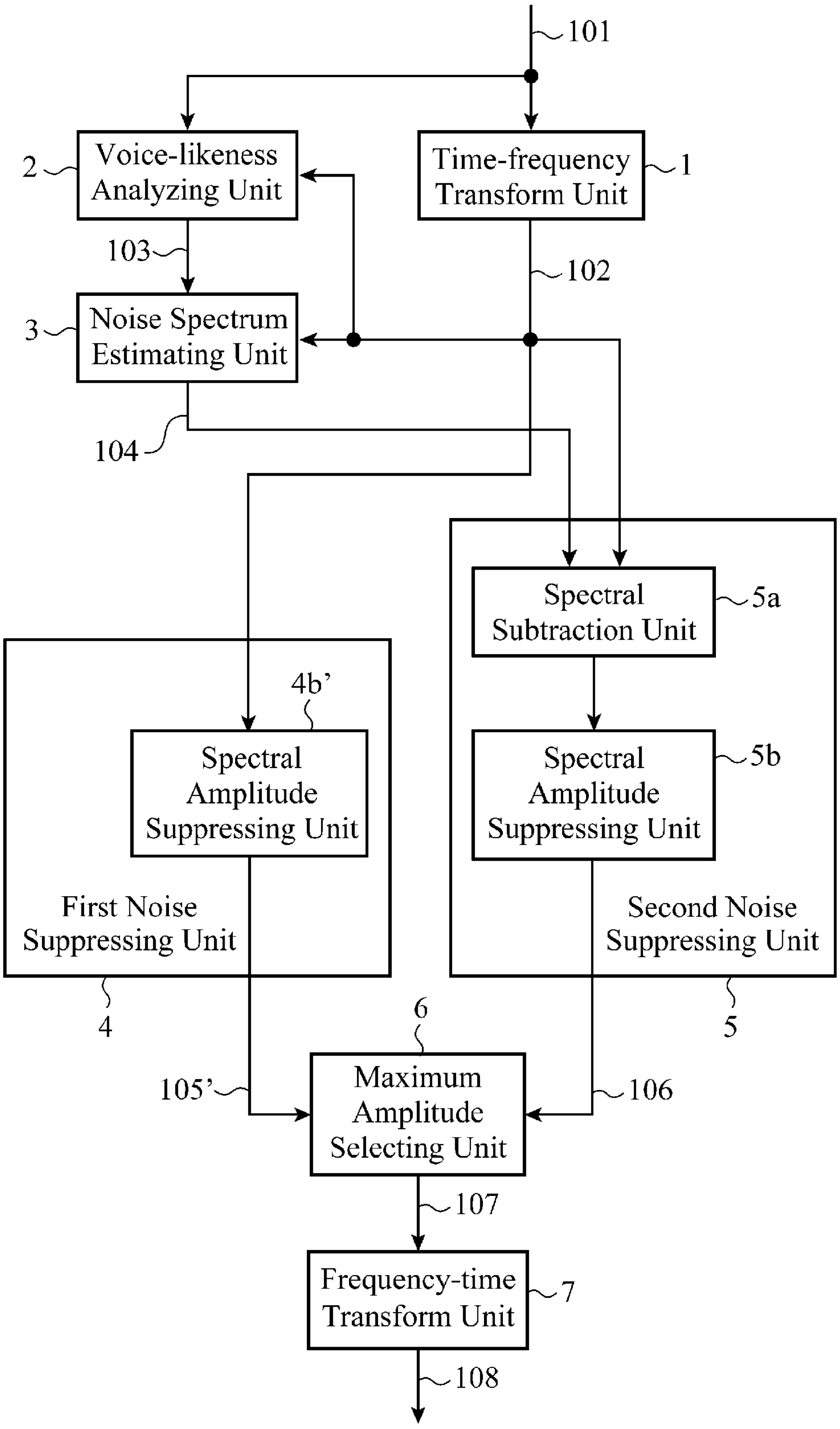
FIG. 3 is a block diagram showing a configuration of the noise suppressor of an embodiment 2.

FIG. 3 is a block diagram showing a configuration of the noise suppressor of an embodiment 2 in accordance with the present invention. The noise suppressor of the embodiment 2 has a configuration in which the first noise suppressing unit comprises only the spectral amplitude suppressing unit. In the following, the same components as those of the embodiment 1 are designated by the same reference numerals as in FIG. 1, and their description will be omitted or simplified.

In the first noise suppressing unit 4, the spectral amplitude suppressing unit 4*b*' multiplies the input spectrum 102 supplied from the time-frequency transform unit 1 by a fixed amplitude suppression gain, and supplies the result obtained to the maximum amplitude selecting unit 6 as a first noise suppressed spectrum 105'.

Figure 4:
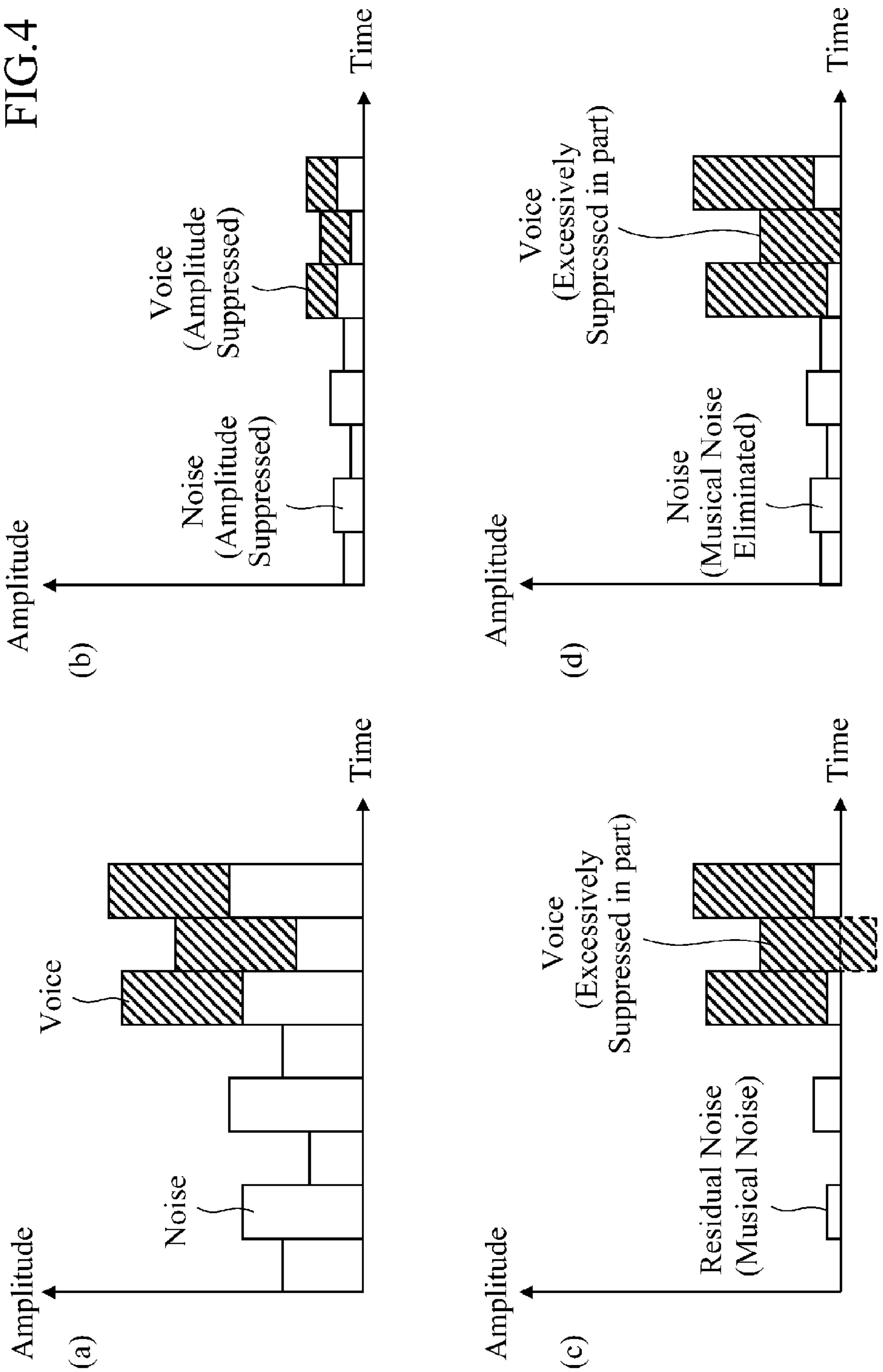
FIG. 4 is a schematic diagram showing an example of time transitions of spectral components in the embodiment 2.

FIG. 4 shows time transitions of the spectral components at a certain frequency. FIG. 4(*a*) shows a time transition of the input spectrum, FIG. 4(*b*) shows that of the first noise suppressed spectrum, FIG. 4(*c*) shows that of the second noise suppressed spectrum, and FIG. 4(*d*) shows that of the output spectrum. In the drawings, the horizontal axis shows the time and the vertical axis shows the amplitude. Furthermore, outline columns show the noise amplitude and diagonally shaded columns show the voice amplitude. Along the time axis, five intervals in the first half are noise signal intervals, and three intervals in a second half are voice signal intervals upon which noise is superposed.

Incidentally, the input spectrum of FIG. 4(*a*) is the same as that of FIG. 2(*a*) in the embodiment 1. In addition, since the noise suppressor of the embodiment 2 comprises the same second noise suppressing unit 5 as that of the embodiment 1, the noise suppressed spectrum of FIG. 4(*c*) is the same as that of FIG. 2(*c*) of the embodiment 1 and hence the description thereof is omitted.

The spectral amplitude suppressing unit 4*b*' of the first noise suppressing unit 4 obtains the first noise suppressed spectrum 105' shown in FIG. 4(*b*) by multiplying the input spectrum 102 shown in FIG. 4(*a*) by the fixed amplitude suppression gain. Since it multiplies the fixed amplitude suppression gain, no offensive artificial noise (musical noise) is produced and only the amplitude reduces.

FIG. 4(*d*) shows the output spectrum 107 the maximum amplitude selecting unit 6 obtains by selecting greater one of the first noise suppressed spectrum 105' of FIG. 4(*b*) and the second noise suppressed spectrum 106 of FIG. 4(*c*). Since the amplitude suppression gain in the first noise suppressing unit 4 is set in such a manner as to become greater than most of the amplitude suppression gains in the noise signal intervals of the second noise suppressing unit 5, the amplitude of the first noise suppressed spectrum 105' becomes greater in most of the noise signal intervals and is selected as the output spectrum 107. Thus, the island-like residual noise in the noise signal intervals is eliminated and the musical noise is cleared away. In addition, since the lesser excessive suppression columns are selected in the voice signal intervals, the output spectrum 107 with lesser excessive suppression is obtained, which reduces the disconnected feeling of the voice. In addition, in the voice signal intervals, the second noise suppressed spectrum 106 has greater amplitude inmost of the intervals and is selected as the output spectrum 107. Although not shown in the drawing, when the amplitude of the second noise suppressed spectrum 106 becomes very small in the voice signal intervals, the first noise suppressed spectrum 105' is selected. Thus, the voice with a certain fixed level is output and the disconnected feeling of the voice is reduced.

Incidentally, although the foregoing embodiment 2 has a configuration including two noise suppressing units, the first noise suppressing unit 4 and second noise suppressing unit 5, a configuration is also possible which comprises three or more noise suppressing units, in which the maximum amplitude selecting unit 6 selects the maximum values of the spectral components for the individual frequencies from the three or more noise suppressed spectrums.

In addition, although the second noise suppressing unit 5 has a configuration including the spectral subtraction unit 5*a* and spectral amplitude suppressing unit 5*b*, a configuration is also possible which includes only the spectral subtraction unit 5*a*, for example.

Furthermore, although the foregoing embodiment 2 is configured in such a manner that the voice-likeness analyzing unit 2 and noise spectrum estimating unit 3 perform the estimation of the estimated noise spectrum 104, a means for obtaining the estimated noise spectrum 104 is not limited to the configuration.

For example, a method can also be employed which obviates the voice-likeness analyzing unit 2 by configuring the noise spectrum estimating unit 3 in such a manner as to perform the update very slowly and without interruption, or which does not perform the estimation of the estimated noise spectrum 104 from the input signal 101, but performs the analysis/estimation separately from the input signal used for the noise estimation, to which only noise is input.

As described above, according to the present embodiment 2, it is configured in such a manner as to compare for the individual frequency components the values of the first and second noise suppressed spectra 105' and 106 the first and second noise suppressing units 4 and 5 output, and to obtain the output spectrum 107 by selecting the maximum values between them as the frequency components. Thus, it can select the spectrum not suppressed excessively, thereby being able to realize a high quality noise suppressor capable of reducing the musical noise sharply and reducing unstable fluctuations in the voice signal intervals.

In addition, since it makes spectrum selection according to the comparison between the individual frequency components, it does not switch all the frequency components collectively with the noise suppressing unit as the conventional technique that selects one of the outputs of the noise suppressing unit according to the voice/noise decision, and hence it can suppress large fluctuations in the spectrum and prevent the quality deterioration due to the error of the voice/noise decision, and can suppress the occurrence of musical noise in a band in which the noise components in the voice signal intervals are dominant.

Besides, according to the present embodiment 2, since it is configured in such a manner as to set the amplitude suppression gain of the first noise suppressing unit 4 at a value greater than most of the amplitude suppression gains in the noise signal intervals of the second noise suppressing unit 5, and to generally select the output of the first noise suppressing unit 4 in the noise signal intervals, it can improve the quality because its output undergoes only the amplitude suppression that does not cause musical noise in the noise signal intervals.

In addition, when it comprises a plurality of noise suppressing units, since it can employ a system that allows the other noise suppressing units to produce the musical noise in the noise signal intervals and that has good quality in the voice signal intervals, it can realize high quality noise suppression in the voice signal intervals as well.

Furthermore, according to the present embodiment 2, it is configured in such a manner that the second noise suppressing unit 5 generates the noise suppressed spectrum by combining the spectral subtraction with the spectral amplitude suppression. Accordingly, it can adaptively control the amounts of attenuation of the spectral amplitude suppressing unit 5*b* in such a manner as to reduce the fluctuations in the amplitude suppression gains as the whole second noise suppressing unit 5 in the noise signal intervals. This makes it easier to set the output of the first noise suppressing unit to be selected generally in the noise signal intervals. This enables further suppression of the musical noise in the noise signal intervals.

Embodiment 3

Although the foregoing embodiment 1 and embodiment 2 show the configurations that compare for the individual frequency components the plurality of noise suppressed spectra 105 (105') and 106 the plurality of noise suppressing units 4 and 5 output, and that obtain the output spectrum 107 consisting of these frequency components, a configuration is also possible which returns the plurality of noise suppressed spectra to time domain signals, respectively, and selects the maximums among the plurality of time domain signals.

As a means for returning the noise suppressed spectra to the time domain signals, the same unit as the frequency-time transform unit 7 can be used. In addition, a configuration is also possible which selects the maximums before windowing in order to make smooth connection with the previous and subsequent frames.

As described above, according to the present embodiment 3, it is configured in such a manner as to return the plurality of noise suppressed spectra the plurality of noise suppressing units output to the time domain signals, and to select the maximums among the plurality of time domain signals obtained. Thus, it can select the signal not suppressed excessively, thereby being able to realize a high quality noise suppressor capable of reducing the musical noise sharply and reducing unstable fluctuations in the voice signal intervals.

In addition, since it makes signal selection according to comparison between the time domain signals, it does not switch all the frequency components collectively with the noise suppressing unit as the conventional technique that selects one of the outputs of the noise suppressing unit according to the voice/noise decision, and hence it can suppress large fluctuations in the signal and prevent the quality deterioration due to the error of the voice/noise decision.

INDUSTRIAL APPLICABILITY

As described above, the present invention can reduce the offensive noise (musical noise) and has high quality noise suppression property. Accordingly, it is widely applicable to voice communication systems and voice recognition systems used under various noise environments.

What is claimed is:

1. A noise suppressor comprising:
a plurality of noise suppressing units that
perform individual noise suppression on an input spectrum obtained from an input signal of time-domain, the input spectrum being a component of amplitude spectra according to frequencies, and
output noise suppressed spectra obtained by the individual noise suppression; and
a selecting unit that
compares, with respect to each frequency, amplitude values of the noise suppressed spectra output by the plurality of noise suppressing units,
selects a noise suppressed spectrum having a maximum value out of the compared amplitude values, and
outputs the selected noise suppressed spectrum.

2. The noise suppressor according to claim 1, wherein
the noise suppressing units comprise a first noise suppressing unit that performs one of the individual noise suppression, wherein
the first noise suppressing unit generates the noise suppressed spectrum by multiplying the input spectrum by amplitude suppression gains, and wherein
the amplitude suppression gains of the first noise suppressing unit are greater than amplitude suppression gains in noise signal intervals of the other noise suppressing units.

3. The noise suppressor according to claim 2, wherein
the first noise suppressing unit makes the amplitude suppression gains large values when estimated SN ratios which are calculated from the input spectrum and from a noise spectrum estimated from a previous frame are high, and makes the amplitude suppression gains small values when the estimated SN ratios are low.

4. The noise suppressor according to claim 2, wherein
the noise suppressing unit comprises a second noise suppressing unit that performs another one of the individual noise suppression, wherein
the second noise suppressing unit comprises a subtraction unit that performs spectral subtraction, and an amplitude suppressing unit that suppresses spectral amplitude, the subtraction unit and the amplitude suppressing unit being used for generating the noise suppressed spectrum.

5. The noise suppressor according to claim 1, further comprising a transform unit that transforms the noise suppressed spectra output by the plurality of noise suppressing units into a plurality of time-domain signals,
wherein the selecting unit selects a time-domain signal having maximum amplitude out of the plurality of time-domain signals, and outputs the selected time-domain signal.

6. A noise suppressing method comprising:
performing, by utilizing a plurality of noise suppressing units, individual noise suppression on an input spectrum obtained from an input signal of time-domain, the input spectrum being a component of amplitude spectra according to frequencies, and outputting noise suppressed spectra obtained by the individual noise suppression;
comparing, with respect to each frequency, amplitude values of the noise suppressed spectra output by the plurality of noise suppressing units;
selecting a noise suppressed spectrum having a maximum value out of the compared amplitude values; and
outputting the selected noise suppressed spectrum.

7. The noise suppressing method according to claim 6, further comprising:
performing, by utilizing a first noise suppressing unit included in said plurality of noise suppressing units, one of the individual noise suppression; and
generating, by utilizing the first noise suppressing unit, the noise suppressed spectrum by multiplying the input spectrum by amplitude suppression gains, wherein
the amplitude suppression gains of the first noise suppressing unit are greater than amplitude suppression gains in noise signal intervals of the other noise suppressing units.

8. The noise suppressing method according to claim 7, wherein
the first noise suppressing unit makes the amplitude suppression gains large values when estimated SN ratios which are calculated from the input spectrum and from a noise spectrum estimated from a previous frame are high, and makes the amplitude suppression gains small values when the estimated SN ratios are low.

9. The noise suppressing method according to claim 7, further comprising:
performing, by utilizing a second noise suppressing unit included in said plurality of noise suppressing units, another one of the individual noise suppression, and wherein
the second noise suppressing unit comprises a subtraction unit that performs spectral subtraction, and an amplitude suppressing unit that suppresses spectral amplitude, the subtraction unit and the amplitude suppressing unit being used for generating the noise suppressed spectrum.

10. The noise suppressing method according to claim 6, further comprising:
transforming the noise suppressed spectra output by the plurality of noise suppressing units into a plurality of time-domain signals;
selecting a time-domain signal having maximum amplitude out of the plurality of time-domain signals; and
outputting the selected time-domain signal.

* * * * *